US010324567B2

(12) United States Patent
Cho et al.

(10) Patent No.: US 10,324,567 B2
(45) Date of Patent: Jun. 18, 2019

(54) TOUCH SENSING SYSTEM AND METHOD OF REDUCING LATENCY THEREOF

(71) Applicant: LG DISPLAY CO., LTD., Seoul (KR)

(72) Inventors: Jiho Cho, Gimpo-si (KR); Dongjo Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/067,735

(22) Filed: Oct. 30, 2013

(65) Prior Publication Data
US 2014/0118301 A1   May 1, 2014

(30) Foreign Application Priority Data
Oct. 30, 2012   (KR) .................. 10-2012-0121118

(51) Int. Cl.
*G06F 3/044*   (2006.01)
*G06F 3/041*   (2006.01)

(52) U.S. Cl.
CPC ............ *G06F 3/044* (2013.01); *G06F 3/0416* (2013.01)

(58) Field of Classification Search
CPC .... G06F 1/3234; G06F 1/3262; G06F 1/3287; G06F 1/329; G06F 3/041; G06F 3/0412; G06F 3/0414; G06F 3/044; G06F 3/045
USPC ................................ 345/173–179
See application file for complete search history.

(56) References Cited

U.S. PATENT DOCUMENTS

| 6,058,485 | A  | * | 5/2000  | Koziuk    | G06F 1/3215 |
|           |    |   |         |           | 345/173     |
| 6,552,578 | B1 | * | 4/2003  | Cheung et al. | 327/26  |
| 2002/0091952 | A1 | * | 7/2002  | Lin et al. | 713/300 |
| 2009/0289908 | A1 | * | 11/2009 | Chen et al. | 345/173 |
| 2010/0214255 | A1 | * | 8/2010  | Chang et al. | 345/174 |
| 2010/0253639 | A1 | * | 10/2010 | Huang et al. | 345/173 |
| 2011/0061947 | A1 | * | 3/2011  | Krah et al. | 178/18.01 |
| 2011/0115717 | A1 | * | 5/2011  | Hable et al. | 345/173 |
| 2011/0179297 | A1 | * | 7/2011  | Simmons    | G06F 1/325 |
|           |    |   |         |           | 713/323     |
| 2012/0105372 | A1 | * | 5/2012  | Chang et al. | 345/174 |
| 2012/0157167 | A1 | * | 6/2012  | Krah      | G06F 1/3203 |
|           |    |   |         |           | 455/566     |
| 2014/0049480 | A1 | * | 2/2014  | Rabii     | 345/173     |

(Continued)

FOREIGN PATENT DOCUMENTS

CN   101583923 A   11/2009
CN   101866231 A   10/2010

(Continued)

Primary Examiner — Alexander Eisen
Assistant Examiner — Nelson Lam
(74) Attorney, Agent, or Firm — Birch, Stewart, Kolasch & Birch, LLP

(57) ABSTRACT

A touch sensing system and a method of reducing latency thereof are disclosed. The touch sensing system includes a touch sensing circuit configured to apply a driving signal to touch sensors, sense voltages of the touch sensors, and output a digital touch raw data; a coordinate calculator configured to analyze the digital touch raw data, and calculate a coordinate information about each of positions of a touch input; and an idle mode controller configured to compare an analog signal received from the touch sensors with a predetermined threshold value, decide whether or not the touch input is generated based on the analog signal, and generate an interrupt signal when the touch input is sensed.

12 Claims, 7 Drawing Sheets

(56) References Cited

U.S. PATENT DOCUMENTS

| | | | |
|---|---|---|---|
| 2014/0092031 A1* | 4/2014 | Schwartz et al. | 345/173 |
| 2014/0118301 A1* | 5/2014 | Cho et al. | 345/174 |
| 2014/0132558 A1* | 5/2014 | Jang | G06F 3/044 |
| | | | 345/174 |
| 2014/0184563 A1* | 7/2014 | Yeh | G06F 3/044 |
| | | | 345/174 |
| 2014/0347306 A1 | 11/2014 | Krah et al. | |
| 2016/0098141 A1* | 4/2016 | Kang | G06F 3/0416 |
| | | | 345/174 |

FOREIGN PATENT DOCUMENTS

| | | |
|---|---|---|
| CN | 202142045 U | 2/2012 |
| KR | 10-2009-0107049 A | 10/2009 |

\* cited by examiner

[FIG. 7]

TOUCH SENSING SYSTEM AND METHOD OF REDUCING LATENCY THEREOF

This application claims the benefit of Korean Patent Application No. 10-2012-0121118 filed on Oct. 30, 2012, the entire contents of which is incorporated herein by reference for all purposes as if fully set forth herein.

BACKGROUND OF THE INVENTION

Field of the Invention

Embodiments of the invention relate to a touch sensing system and a method of reducing latency thereof.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably used in portable information appliances and has been expanded to the use of home appliances. A capacitive touch sensing system includes a capacitive touch screen, which has durability and definition better than an existing resistive touch screen and is able to recognize a multi-touch input and a proximity touch input, thereby making it possible to be applied to various applications. In the touch sensing system, a touch report rate has to increase so as to increase the touch sensitivity a user feels and accurately recognize a touch input trace or a dragging trace. The touch report rate is a velocity or a frequency (Hz), at which coordinate information of touch data obtained by sensing touch sensors present in the touch screen is transmitted to an external host system.

In general, the touch sensing system supplies driving signals to the touch sensors through lines formed on the touch screen, senses a change in voltages of the touch sensors before and after a touch operation, and converts a change amount of the voltage into digital data, i.e., touch raw data. The touch sensing system compares the touch raw data with a predetermined threshold value. The touch sensing system decides touch raw data, which is greater than the threshold value, as touch data obtained from the touch sensor, in which a touch input is generated. The touch sensing system executes a touch recognition algorithm and calculates coordinates of the touch data.

The touch sensing system may set its operation mode to an idle mode. When a period, in which there is no touch input, lasts for a predetermined period of time, the touch sensing system operates in the idle mode. The touch sensing system drives the touch screens in a markedly longer cycle than a normal operation mode (or an active mode), so as to reduce power consumption in the idle mode.

As shown in FIG. 1, one period of the idle mode is divided into a sensing time Tsense and an idle time Tidle. The touch sensing system supplies driving signals to the touch sensors through the lines of the touch screen for the sensing time Tsense of the idle mode and senses voltages of the touch sensors. Subsequently, the touch sensing system stops an output of a driving circuit of the touch screen for the idle time Tidle of the idle mode. As a result, the touch sensing system may sense the touch input only within a short sensing time Tsense of each of a first period P(N) and a second period P(N+1) in the idle mode.

The touch sensing system is converted from the idle mode to the normal operation mode when the touch input is sensed in the sensing time Tsense of the idle mode, and shortens a sensing cycle of the touch screen in the normal operation mode. On the other hand, the touch sensing system cannot sense the touch input for the idle time Tidle of the idle mode. When a touch input generated for an idle time Tidle of the first period P(N) lasts up to a sensing time Tsense subsequent to the idle time Tidle, the touch sensing system senses the touch input for the sensing time Tsense of the first period P(N) and is converted from the idle mode to the normal operation mode. Thus, a latency it takes for the touch sensing system to sense the touch input when the idle mode is converted into the normal operation mode may increase by the idle time Tidle. The latency reduces the touch sensitivity the user feels.

SUMMARY OF THE INVENTION

Embodiments of the invention provide a touch sensing system and a method of reducing latency thereof capable of reducing latency when an idle mode is converted into a normal operation mode.

In one aspect, there is a touch sensing system including a touch sensing circuit configured to apply a driving signal to touch sensors, sense voltages of the touch sensors, and output a digital touch raw data; a coordinate calculator configured to analyze the digital touch raw data, and calculate a coordinate information about each of positions of a touch input; and an idle mode controller configured to compare an analog signal received from the touch sensors with a predetermined threshold value, decide whether or not the touch input is generated based on the analog signal, and generate an interrupt signal when the touch input is input, The interrupt signal awakes the coordinate calculator from the idle mode.

In another aspect, there is a method of reducing latency of a touch sensing system includes comparing an analog signal received from the touch sensors with a predetermined threshold value to decide whether or not the touch input is generated, generating an interrupt signal when the touch input is generated, and operating the coordinate calculator using the interrupt signal in the idle mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

A display device according to an exemplary embodiment of the invention may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other types of flat panel displays may be used.

A touch sensing system according to the embodiment of the invention may be implemented as a capacitive touch screen which senses a touch input through a plurality of capacitive sensors. The capacitive touch screen includes a plurality of touch sensors. Each of the touch sensors has a capacitance when viewed through an equivalent circuit. The capacitance may be divided into a self capacitance and a mutual capacitance. The self capacitance is formed along conductor lines of a single layer formed in one direction. The mutual capacitance is formed between two conductor lines perpendicular to each other. In the following description, a mutual capacitive touch screen will be described as an example of the capacitive touch screen. Other types of capacitive touch screens may be used.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 4:
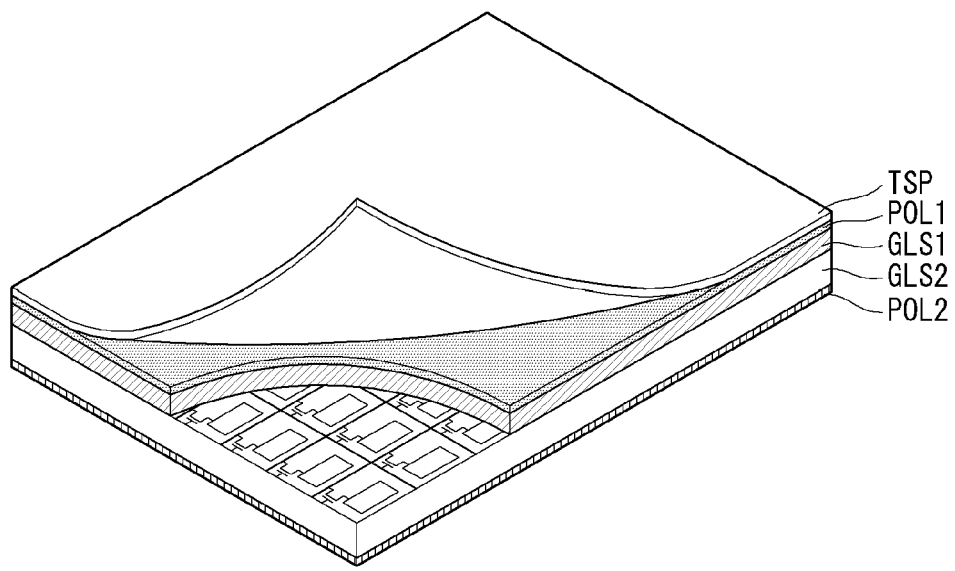
FIGS. 4 to 6 illustrate various combinations of a touch screen and a display panel according to an exemplary embodiment of the invention.
Figure 5:
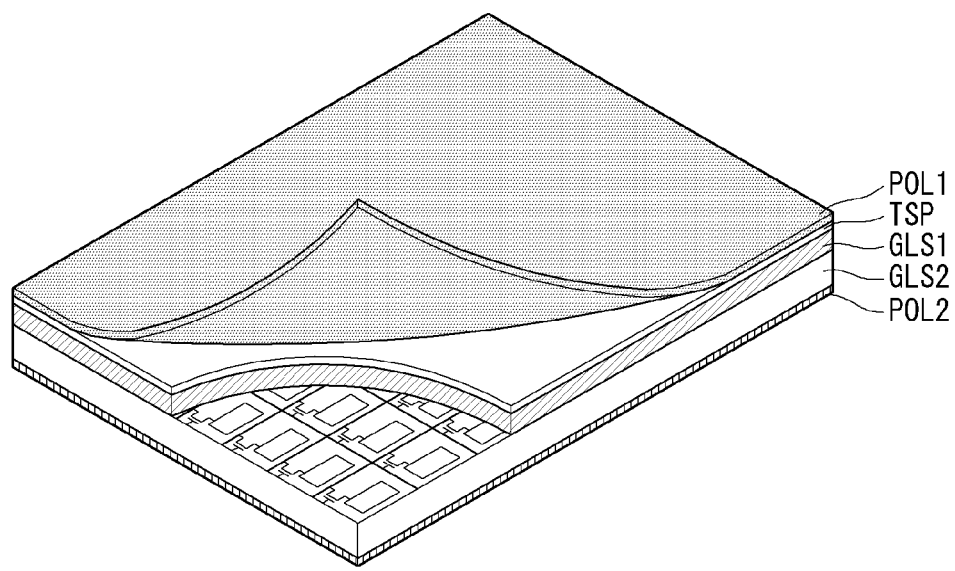
Figure 6:
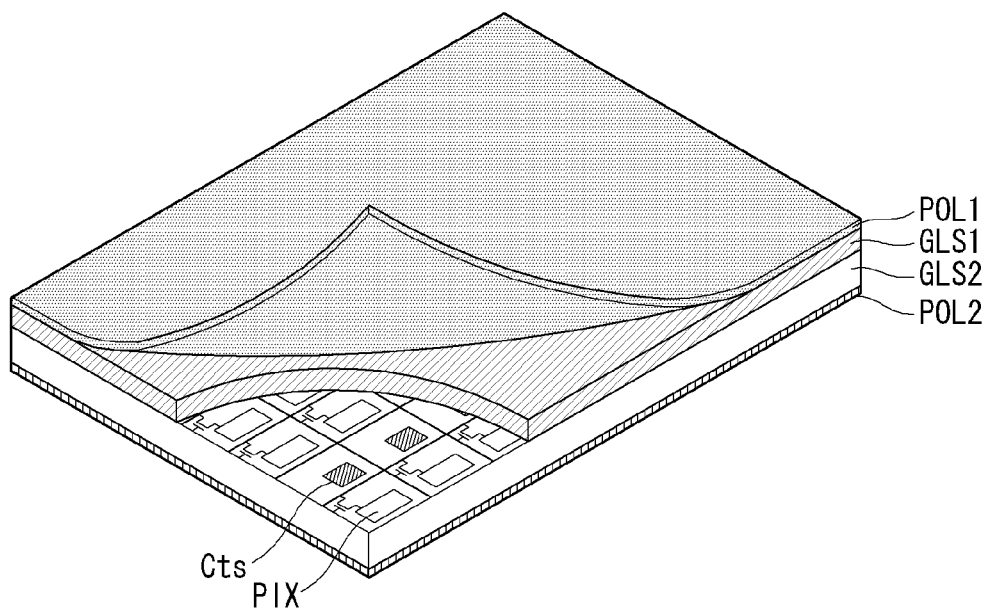

As shown in FIGS. 2 to 6, the touch sensing system according to the embodiment of the invention includes a touch screen TSP which is disposed on a display panel DIS or mounted in the display panel DIS, a display driving circuit, a touch screen driving circuit, etc. As shown in FIG. 4, the touch screen TSP may be attached on an upper polarizing plate POL1 of the display panel DIS. Alternatively, as shown in FIG. 5, the touch screen TSP may be formed between the upper polarizing plate POL1 and an upper substrate GLS1 of the display panel DIS. Alternatively, as shown in FIG. 6, touch sensors Cts of the touch screen TSP may be mounted in a lower substrate GLS2 of the display panel DIS along with a pixel array of the display panel DIS in an in-cell type. In FIGS. 4 to 6, 'PIX' denotes a pixel electrode of a liquid crystal cell, and 'POL2' denotes a lower polarizing plate of the display panel DIS.

The display panel DIS includes the lower substrate GLS2, the upper substrate GLS1, and a liquid crystal layer formed between the lower substrate GLS2 and the upper substrate GLS1. The pixel array of the display panel DIS includes a plurality of pixels formed in pixel areas defined by data lines D1 to Dm and gate lines (or scan lines) G1 to Gn, where m and n are a positive integer. Each of the pixels includes a plurality of thin film transistors (TFTs) formed at crossings of the data lines D1 to Dm and the gate lines G1 to Gn, a pixel electrode charged to a data voltage, a storage capacitor which is connected to the pixel electrode and holds a voltage of the liquid crystal cell, etc.

Black matrixes, color filters, etc. are formed on the upper substrate GLS1 of the display panel DIS. The lower substrate GLS2 of the display panel DIS may be configured in a COT (color filter on TFT) structure. In this instance, the black matrixes and the color filters may be formed on the lower substrate GLS2 of the display panel DIS. Common electrodes, to which a common voltage is supplied, may be formed on the upper substrate GLS1 or the lower substrate GLS2 of the display panel DIS. The polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer is formed between the upper and lower substrates GLS1 and GLS2 of the display panel DIS to keep cell gaps of the liquid crystal cells constant.

A backlight unit may be disposed under a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a timing controller 20. The display driving circuit applies a video data voltage of an input image to the pixels of the display panel DIS. The data driving circuit 12 converts digital video data RGB received from the timing controller 20 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS to which the data voltage will be applied.

The timing controller 20 receives timing signals, such as a vertical sync signal Vsync, a horizontal sync signal Hsync, a data enable signal DE, and a main clock MCLK, from a host system 40. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The touch screen TSP includes Tx lines Tx1 to TxN, where N is a positive integer, Rx lines Rx1 to RxM crossing the Tx lines Tx1 to TxN, where M is a positive integer, and MN touch sensors Cts formed at crossings of the Tx lines Tx1 to TxN and the Rx lines Rx1 to RxM. Each of the touch sensors Cts has a mutual capacitance.

Figure 1:
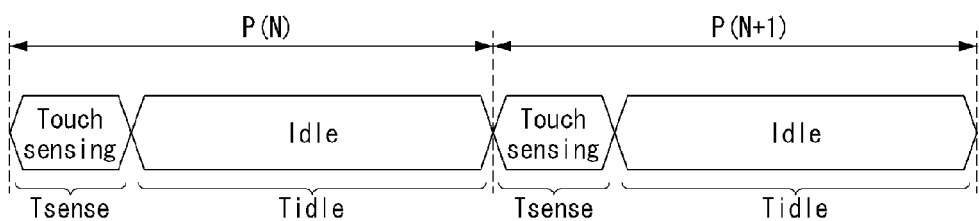
FIG. 1 illustrates an operation of a touch sensing system in an idle mode.

The touch screen driving circuit includes a touch sensing circuit 30, an idle mode controller 60, and a coordinate calculator 36. The touch screen driving circuit transmits coordinate information of a touch input on the touch screen TSP to the host system 40. When a period, in which there is no touch input, lasts for a predetermined period of time, the touch screen driving circuit operates in an idle mode illustrated in FIG. 1.

The host system 40 may be implemented as one of a television system, a set-top box, a navigation system, a DVD player, a Blu-ray player, a personal computer (PC), a home theater system, and a phone system. The host system 40 includes a system on chip (SoC), in which a scaler is embedded, and thus converts the digital video data RGB of the input image into a data format suitable for displaying on the display panel DIS. The host system 40 transmits the digital video data RGB and the timing signals Vsync, Hsync, DE, and MCLK to the timing controller 20. Further, the host system 40 runs an application associated with coordinate information XY of touch data received from the coordinate calculator 36.

Figure 2:
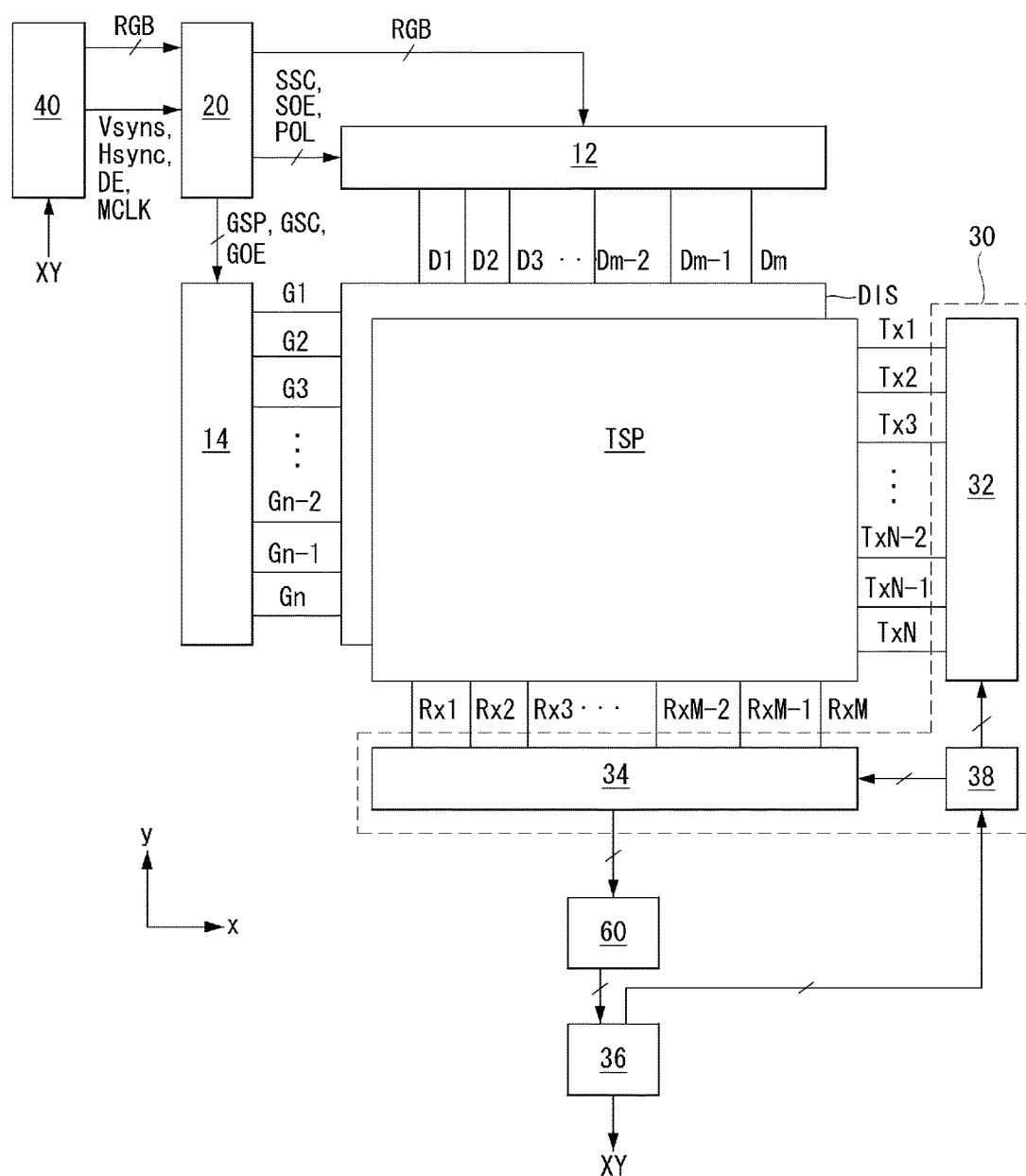
FIG. 2 illustrates a touch sensing system according to an exemplary embodiment of the invention.
Figure 3:
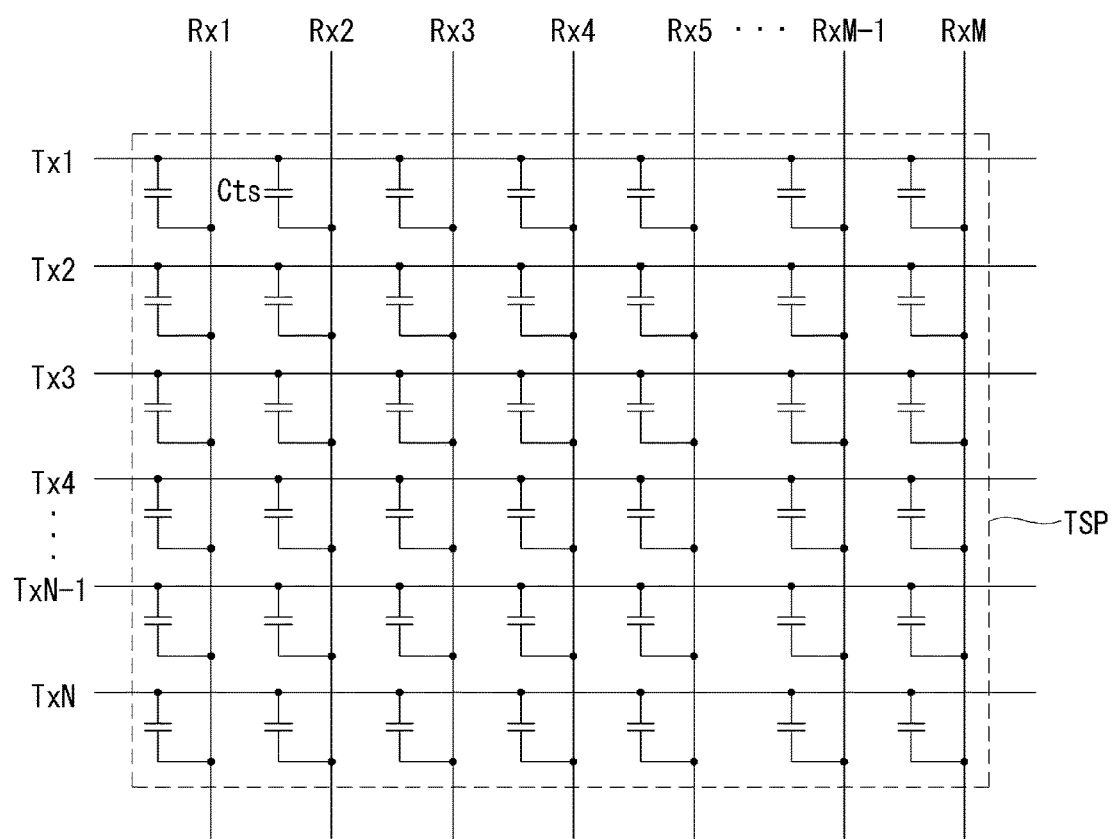
FIG. 3 is an equivalent circuit diagram of a touch screen shown in FIG. 2.
Figure 7:
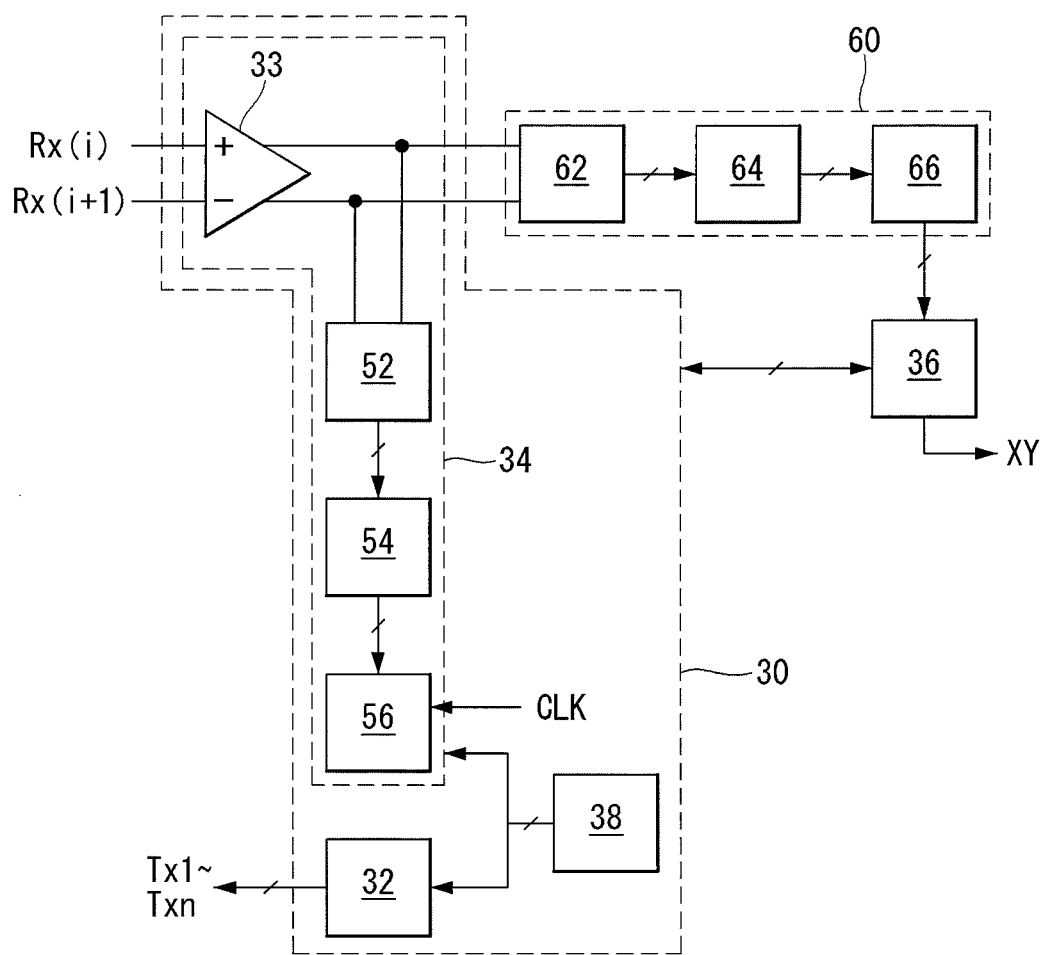
FIG. 7 illustrates an idle mode controller according to an exemplary embodiment of the invention.
Figure 8:
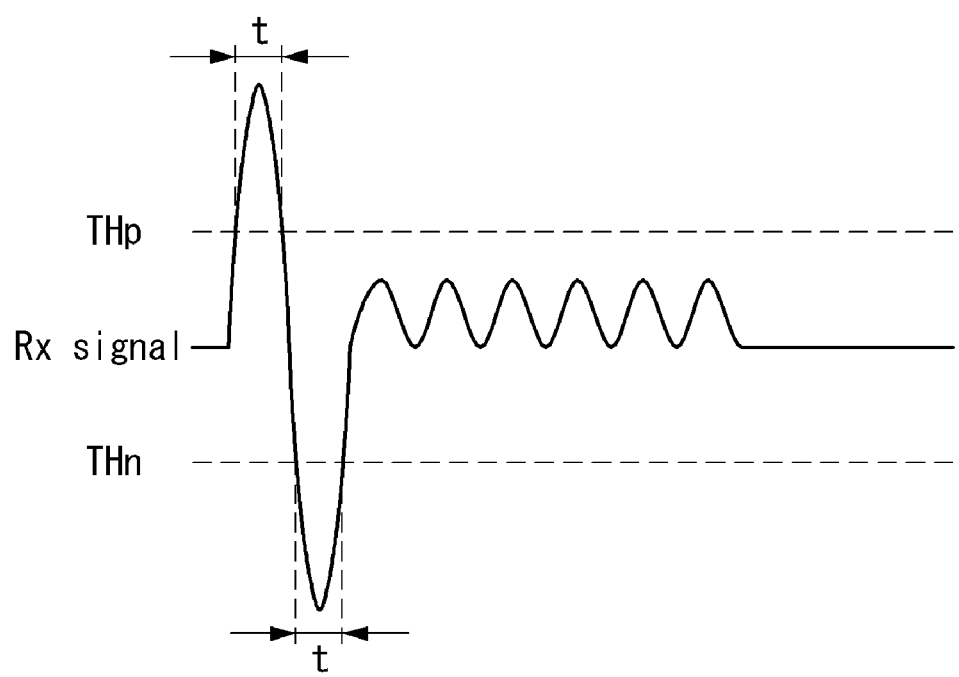
FIG. 8 is a waveform diagram illustrating a threshold value set by an idle mode controller.

FIG. 7 illustrates in detail the idle mode controller 60 shown in FIG. 2. FIG. 8 is a waveform diagram illustrating a threshold value set by the idle mode controller 60.

As shown in FIGS. 7 and 8, the touch sensing circuit 30 includes a Tx driving circuit 32, an Rx driving circuit 34, a Tx/Rx controller 38, etc.

In a normal operation mode, the touch sensing circuit 30 applies the driving signal to the touch sensors Cts through the Tx lines Tx1 to TxN using the Tx driving circuit 32 and senses the voltages of the touch sensors Cts in synchronization with the driving signal through the Rx lines Rx1 to RxM and the Rx driving circuit 34, thereby outputting touch raw data, which is digital data. The driving signal may be generated in various waveforms including a pulse wave, a sine wave, a triangle wave, etc. The touch sensing circuit 30 operates for a short sensing time Tsense of the idle mode illustrated in FIG. 1 and does not operate for an idle time Tidle of the idle mode illustrated in FIG. 1. The touch sensing circuit 30 is converted from the idle mode to the normal operation mode when a clock signal CLK shown in FIG. 7 is input from the coordinate calculator 36. Thus, an operation time per unit time of the touch sensing circuit 30 in the idle mode is less than that of the touch sensing circuit 30 in the normal operation mode. As a result, power consumption of the touch sensing circuit 30 in the idle mode is greatly reduced compared to the normal operation mode. The unit time is P(N) and P(N+1) illustrated in FIG. 1.

The touch sensing circuit 30 may be integrated into one readout integrated circuit (ROIC). Further, the touch sensing circuit 30, the idle mode controller 60, and the coordinate calculator 36 may be integrated into one integrated circuit (IC).

In the normal operation mode, the Tx driving circuit 32 selects a Tx channel, to which the driving signal will be output, in response to a Tx setup signal from the Tx/Rx controller 38 and applies the driving signal to the Tx lines Tx1 to TxN connected with the selected Tx channel. The Tx lines Tx1 to TxN are charged during a high potential period of the driving signal and supply charges to the touch sensors Cts. The Tx lines Tx1 to TxN are discharged during a low potential period of the driving signal. The driving signal can be successively supplied to each of the Tx lines Tx1 to TxN, so that the voltages of the touch sensors Cts can be accumulated in a capacitor of an integrator embedded in the Rx driving circuit 34 through the Rx lines Rx1 to RxM.

The Rx driving circuit 34 includes a differential amplifier 33, a sampling circuit 52, an integrator 54, an analog-to-digital converter (ADC) 56, etc. In the normal operation mode, the Rx driving circuit 34 selects Rx lines Rx(i) and Rx(i+1), to which the voltages of the touch sensors Cts will be received, in response to an Rx setup signal from the Tx/Rx controller 38. The differential amplifier 33 outputs a difference between the voltages of the touch sensors Cts received through the Rx lines Rx(i) and Rx(i+1). The differential amplifier 33 may be implemented as a fully differential amplifier, which amplifies a difference between the voltages obtained from the adjacent touch sensors through a positive output terminal and a negative output terminal and outputs voltages of positive and negative signals having a complementary relation. The differential amplifier 33 may be omitted. The sampling circuit 52 samples one of an analog signal and an analog output signal of the differential amplifier 33, which are received through the Rx lines Rx(i) and Rx(i+1), using a switching element and a capacitor and supplies the sampled voltage to the integrator 54. The switching element of the sampling circuit 52 is controlled by a switching control signal received from the coordinate calculator 36. The integrator 54 accumulates analog signals received from the sampling circuit 52 in proportion to the number of driving signals supplied to the Tx lines, so as to increase changes in the voltages of the touch sensors Cts before and after a touch operation. The ADC 56 converts the analog signals accumulated in the integrator 54 into digital data in conformity with clock timing of the clock signal CLK and outputs touch raw data.

In the normal operation mode, the Tx/Rx controller 38 generates the Tx setup signal and the Rx setup signal, controls the setting of the Tx and Rx channels, and synchronizes the Tx driving circuit 32 with the Rx driving circuit 34. The Tx/Rx controller 38 generates the Tx and Rx setup signals and an internal clock signal, so that the Tx driving circuit 32 and the Rx driving circuit 34 operate for the sensing time Tsense of the idle mode. In the embodiment of the invention, the internal clock signal is generated in an oscillator mounted in the touch sensing circuit 30, and thus is different from an external clock signal received from the coordinate calculator 36.

The idle mode controller 60 rapidly decides whether or not the touch input is generated based on the analog signal received from the touch sensors Cts. When the touch input is sensed, the idle mode controller 60 generates an interrupt signal and operates the coordinate calculator 36 using the interrupt signal. The coordinate calculator 36 operates the touch sensing circuit 30 when the interrupt signal is received in the idle mode. Thus, when the touch input is sensed in the idle mode, the idle mode controller 60 rapidly converts the operation mode of the coordinate calculator 36 and the touch sensing circuit 30, which are stopped, from the idle mode to the normal operation mode.

The idle mode controller 60 compares the voltage, i.e., the analog signal of the touch sensors Cts received through the Rx lines Rx1 to RxM with a predetermined threshold value. When the analog signal greater than the threshold value is detected, the idle mode controller 60 transmits the interrupt signal to the coordinate calculator 36. Thus, the idle mode controller 60 rapidly decides whether or not the touch input is generated based on the analog signal received from the touch sensors Cts in the idle mode. The idle mode controller 60 does not calculate coordinates about the touch input and decides only whether or not the touch input is generated based on a result of the comparison between the analog signal and the threshold value. Therefore, a processing speed of the idle mode controller 60 is very rapid.

The idle mode controller 60 decides whether or not the touch input is generated based on the analog signal before passing through the ADC 56 of the Rx driving circuit 34, and rapidly instructs the touch input or the non-touch input to the coordinate calculator 36. Hence, when the touch input is sensed, the idle mode controller 60 rapidly converts the coordinate calculator 36, which is stopped, from the idle mode to the normal operation mode. The idle mode controller 60 is enabled by the coordinate calculator 36 to operate only in the idle mode and is disabled by the coordinate calculator 36 to not operate in the normal operation mode. Thus, the interrupt signal may be generated only in the idle mode. The idle mode controller 60 and the touch sensing circuit 30 may be together mounted in one ROIC.

The idle mode controller 60 may include a first comparator 62, a counter 64, and a second comparator 66, so as to accurately sense the touch input or the non-touch input. The first comparator 62 compares the analog signal received from the touch sensors through the Rx lines or the analog signal received from the touch sensors through the Rx lines and the differential amplifier 33 with a previously determined threshold value. The first comparator 62 detects an analog signal period 't', in which an absolute value of the analog signal is greater than the threshold value. The differential amplifier 33 may generate a positive output and a negative output. For this, as shown in FIG. 8, two threshold values THp and THn may be set by the first comparator 62. The first threshold value THp is a positive voltage greater than a predetermined reference voltage, and the second threshold value THn is a negative voltage less than the predetermined reference voltage. The first threshold value THp is compared with a positive analog signal voltage greater than the reference voltage, and the second threshold value THn is compared with a negative analog signal voltage less than the reference voltage. The first comparator 62 compares the two threshold values THp and THn with the analog signal received through the Rx lines or the analog signal output from the differential amplifier 33, thereby detecting a positive analog signal period 't' greater than the first threshold value THp and detecting a negative analog signal period 't' less than the second threshold value THn. The number of threshold values set by the first comparator 62 is not limited to two. For example, the first comparator 62 may compare one threshold value with the analog signal.

The counter 64 counts the analog signal period 't', in which the absolute value of the analog signal is greater than the threshold values THp and THn in each clock timing of the clock signal CLK, and accumulates a count result of the analog signal period 't', thereby measuring a duration of the analog signal period 't'. The second comparator 66 compares a count value received from the counter 64 with a predetermined reference value. When the count value is greater than the reference value, the second comparator 66 generates an interrupt signal and transmits the interrupt signal to the coordinate calculator 36. The reference value is experimentally determined so that an impulse noise is not misrecognized as a touch input. Because the impulse noise is generated in a very short period of time, a value accumulated in the counter 64 is small. The idle mode controller 60 neglects the impulse noise equal to or less than the reference value generated in a short period of time using the counter 64 and the second comparator 66 and can relatively accurately decide the touch input or the non-touch input. In case of the touch screen TSP, in which the impulse noise is scarcely generated, the counter 64 and the second comparator 66 may be omitted.

In the normal operation mode, the coordinate calculator 36 transmits the clock signal CLK for operating the touch sensing circuit 30 to the Tx/Rx controller 38. The coordinate calculator 36 may be implemented as a microcontroller unit (MCU).

The coordinate calculator 36 executes a previously determined touch recognition algorithm and compares real touch raw data received from the Rx driving circuit 34 with a previously determined threshold value in the normal operation mode. The touch recognition algorithm may use any well-known algorithm. The touch recognition algorithm detects touch raw data, which is equal to or greater than the threshold value. The touch raw data equal to or greater than the threshold value is decided as touch data obtained from the touch sensors in which the touch input is generated. The coordinate calculator 36 executes the touch recognition algorithm and assigns an identification number to each of the touch raw data, which is equal to or greater than the threshold value. The coordinate calculator 36 calculates coordinates of the touch raw data equal to or greater than the threshold value. The coordinate calculator 36 transmits the identification number and coordinate information of each of the touch raw data, which is equal to or greater than the threshold value, to the host system 40.

The threshold value used in the coordinate calculator 36 is set to a digital value compared with the digital data. On the other hand, the threshold value used in the idle mode controller 60 is set to an analog reference voltage compared with the analog signal. Thus, the threshold value of the coordinate calculator 36 is different from the threshold value of the idle mode controller 60.

Other circuits of the coordinate calculator 36 except a receiving function of the interrupt signal are stopped in the idle mode, and thus power consumption of the coordinate calculator 36 is scarcely generated. Namely, in the idle mode, only an interrupt receiving circuit of the coordinate calculator 36 for receiving the interrupt signal from the idle mode controller 60 is enabled, and other circuits of the coordinate calculator 36 are disabled. The interrupt signal awakes the coordinate calculator 36 from the idle mode. The coordinate calculator 36 enables a clock generator responding to the interrupt signal from the idle mode controller 60 in the idle mode, thereby generating the clock signal CLK for operating the ADC 56 of the Rx driving circuit 34. Hence, the coordinate calculator 36 operates in the normal operation mode.

As described above, the touch sensing system according to the embodiment of the invention rapidly decides whether or not the touch input is generated based on the analog signal received from the touch sensors in the idle mode. As a result, the touch sensing system according to the embodiment of the invention may decide the touch input or the non-touch input even in the idle time Tidle as well as the sensing time Tsense of the idle mode illustrated in FIG. 1. Thus, when the touch input is sensed, the touch sensing system according to the embodiment of the invention converts the touch sensing circuit 30 and the coordinate calculator 36 from the idle mode to the normal operation mode at any time. As a result, the touch sensing system according to the embodiment of the invention may minimize the latency generated when the idle mode is converted into the normal operation mode.

Furthermore, as described above, the embodiment of the invention rapidly decides whether or not the touch input is generated based on the analog signal received from the touch sensors, thereby operating the touch screen driving circuit, which is stopped, in the idle mode. As a result, the touch sensing system according to the embodiment of the invention may greatly reduce the latency when the idle mode is converted into the normal operation mode.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system comprising:
   a touch sensing circuit configured to apply a driving signal to touch sensors, sense voltages of the touch sensors through an amplifier, and output a digital touch raw data, wherein an operation time of the touch sensing circuit is reduced in an idle mode;
   a coordinate calculator configured to analyze the digital touch raw data, and calculate coordinate information about each of positions of a touch input,
   wherein other circuits of the coordinate calculator except an interrupt receiving circuit are stopped in the idle mode; and
   an idle mode controller configured to:
      compare an analog signal received directly from the touch sensors through the amplifier with a predetermined threshold value to sense a touch input when the analog signal higher than the predetermined threshold value is detected without calculating coordinates,
      generate an interrupt signal only in the idle mode when the touch input is sensed, and
      transmit the interrupt signal to the coordinate calculator to convert an operation mode of the coordinate calculator from the idle mode to a normal operation mode in response to the interrupt signal such that the coordinate calculator calculates the coordinate information of the touch input in the normal operation mode,
   wherein the idle mode controller decides only whether or not the touch input is generated based on a result of the comparison between the analog signal and the predetermined threshold value without calculating the coordinates, and
   wherein the amplifier generates a positive output and a negative output, and the idle mode controller detects a positive analog signal period in which an absolute value of the positive output of the analog signal is greater than the predetermined threshold value and a negative analog signal period in which an absolute value of the negative output of the analog signal is less than the predetermined threshold value.

2. The touch sensing system of claim 1, wherein the coordinate calculator generates a clock signal for operating the touch sensing circuit in response to the interrupt signal.

3. The touch sensing system of claim 2, wherein the idle mode controller includes:
   a first comparator configured to compare the analog signal received from the touch sensors with the predetermined threshold value;
   a counter configured to measure a duration of an analog signal period in which an absolute value of the analog signal is greater than the predetermined threshold value; and
   a second comparator configured to compare a count value received from the counter with a predetermined reference value and generate the interrupt signal when the count value is greater than the reference value.

4. The touch sensing system of claim 3, wherein the threshold value of the first comparator includes a first threshold value greater than a predetermined reference voltage and a second threshold value less than the predetermined reference voltage.

5. The touch sensing system of claim 4, wherein the first comparator detects a positive analog signal period greater than the first threshold value and detects a negative analog signal period less than the second threshold value.

6. The touch sensing system of claim 5, wherein the counter measures a duration of the positive analog signal period and a duration of the negative analog signal period.

7. A method of reducing latency of a touch sensing system including a touch sensing circuit, which applies a driving signal to touch sensors, senses voltages of the touch sensors through an amplifier, outputs digital touch raw data, which is digital data, and reduces a touch sensing circuit operation time in an idle mode, and a coordinate calculator, which analyzes the digital touch raw data, calculates coordinate information about each of positions of a touch input, and stops other circuits except an interrupt receiving circuit in the idle mode, the method comprising:
   comparing, via an idle mode controller, an analog signal received directly from the touch sensors through the amplifier with a predetermined threshold value to sense a touch input when the analog signal higher than the predetermined threshold value is detected, without calculating coordinates;
   generating, via the idle mode controller, an interrupt signal only in the idle mode when the touch input is sensed; and
   transmitting the interrupt signal to the coordinate calculator to convert an operation mode of the coordinate calculator from the idle mode to a normal operation mode in response to the interrupt signal such that the coordinate calculator calculates the coordinate information of the touch input in the normal operation mode,
   wherein the idle mode controller decides only whether or not the touch input is generated based on a result of the comparison between the analog signal and the predetermined threshold value without calculating the coordinates, and
   wherein the amplifier generates a positive output and a negative output, and the idle mode controller detects a positive analog signal period in which an absolute value of the positive output of the analog signal is greater than the predetermined threshold value and a negative analog signal period in which an absolute value of the negative output of the analog signal is less than the predetermined threshold value.

8. The method of claim 7, further comprising generating a clock signal for operating the touch sensing circuit in response to the interrupt signal.

9. The method of claim 7, wherein the generating of the interrupt signal when the touch input is generated, includes:
   comparing the analog signal received from the touch sensors with the predetermined threshold value;
   measuring a duration of an analog signal period in which an absolute value of the analog signal is greater than the predetermined threshold value; and
   counting the duration of the analog signal period, comparing a count value with a predetermined reference value, and generating the interrupt signal when the count value is greater than the reference value.

10. A touch sensing system comprising:
    a touch sensing circuit configured to apply a driving signal to touch sensors, sense voltages of the touch sensors through an amplifier, and output a digital touch raw data, wherein an operation time of the touch sensing circuit is reduced in an idle mode;

a coordinate calculator configured to analyze the digital touch raw data, and calculate coordinate information about each of positions of a touch input, wherein other circuits of the coordinate calculator except an interrupt receiving circuit are stopped in the idle mode; and an idle mode controller configured to:

compare an analog signal received directly from the touch sensors through the amplifier with a predetermined threshold value to sense a touch input when the analog signal higher than the predetermined threshold value is detected without calculating coordinates, generate an interrupt signal only in the idle mode when the touch input is sensed, and transmit the interrupt signal to the coordinate calculator to convert an operation mode of the coordinate calculator from the idle mode to a normal operation mode in response to the interrupt signal such that the coordinate calculator calculates the coordinate information of the touch input in the normal operation mode, wherein the idle mode controller decides only whether or not the touch input is generated based on a result of the comparison between the analog signal and the predetermined threshold value without calculating the coordinates, wherein the idle mode controller includes:

a first comparator configured to compare the analog signal received from the touch sensors with the predetermined threshold value;

a counter configured to measure a duration of an analog signal period in which an absolute value of the analog signal is greater than the predetermined threshold value; and a second comparator configured to compare a count value received from the counter with a predetermined reference value and generate the interrupt signal when the count value is greater than the reference value.

11. The touch sensing system of claim 10, wherein the threshold value of the first comparator includes a first threshold value greater than a predetermined reference voltage and a second threshold value less than the predetermined reference voltage.

12. The touch sensing system of claim 11, wherein the first comparator detects a positive analog signal period greater than the first threshold value and detects a negative analog signal period less than the second threshold value.

* * * * *